(12) United States Patent
Cuff

(10) Patent No.: US 6,684,460 B2
(45) Date of Patent: Feb. 3, 2004

(54) POT HOLDER

(76) Inventor: Sophie L. Cuff, 5333 Cambourne Pl., West Bloomfield, MI (US) 48332

( * ) Notice: Subject to any disclaimer, the term of this patent is extended or adjusted under 35 U.S.C. 154(b) by 0 days.

(21) Appl. No.: 10/185,140

(22) Filed: Jun. 29, 2002

(65) Prior Publication Data

US 2004/0000033 A1 Jan. 1, 2004

(51) Int. Cl.[7] .................................................. A47J 45/00
(52) U.S. Cl. .......................................... 16/435; 16/431
(58) Field of Search ........................ 16/431, 435, 422, 16/DIG. 12, 904; D6/512, 540, 541, 596; D29/119, 118; 379/452; 38/95; 2/20, 158–160; 15/104.94, 227

(56) References Cited

U.S. PATENT DOCUMENTS

| 2,042,255 | A | * | 5/1936 | Haas | 15/220.4 |
|---|---|---|---|---|---|
| 2,306,062 | A | * | 12/1942 | Katz | 2/20 |
| 2,645,776 | A | * | 7/1953 | Kiler | 16/435 |
| 2,727,238 | A | * | 12/1955 | Silver | 2/20 |
| 2,905,946 | A | * | 9/1959 | Goldsmith | 2/158 |
| 3,445,861 | A | * | 5/1969 | Slimovitz | 2/20 |
| 3,535,708 | A | * | 10/1970 | Alpert et al. | 16/435 |
| 4,201,795 | A | * | 5/1980 | Yamanaka | 426/110 |
| 4,413,034 | A | * | 11/1983 | Anderson | 428/172 |
| D284,520 | S | * | 7/1986 | Handler | D6/595 |
| 6,112,372 | A | * | 9/2000 | Zhou et al. | 16/435 |

FOREIGN PATENT DOCUMENTS

| JP | 10-257986 | * | 9/1998 |
| JP | 2002-336141 A | * | 11/2002 |

* cited by examiner

Primary Examiner—Chuck Y. Mah
(74) Attorney, Agent, or Firm—Law Offices of John Chupa & Assoc, P.C.

(57) ABSTRACT

A pot holder (10) having a plurality of radially projecting lines of stitching (30–36) that form a number of creases that permit a user to fold the pot holder (10) in substantially any direction.

8 Claims, 3 Drawing Sheets

US 6,684,460 B2

POT HOLDER

FIELD OF THE INVENTION

The present invention generally relates to a pot holder and more particularly, to a pot holder which substantially prevents a user from being burned while remaining relatively pliable and soft.

BACKGROUND OF THE INVENTION

Pot holders are commonly employed to permit a user to lift and hold heated cooking implements (e.g., pot handles, baking sheets, or lid knobs) without being burned. Conventional pot holders are generally comprised of a layer of insulating material (e.g., cotton batting) disposed between two layers of fabric which are sewn or otherwise coupled together to form a relatively thick insulated pad. These pot holders are also commonly "quilted" or sewn in a manner to form a plurality of rectangular internal chambers to prevent the insulating material from clumping or moving around within the outer layers.

Additionally, pot holders normally include a border or edge member which is attached around the outer periphery of the layers in order to retain the insulating material between the layers of fabric.

While these current pot holders do prevent a user from coming into direct contact with heated cooking utensils, they do have several drawbacks. For example and without limitation, the quilted pattern only provides a nominal number of directions in which the creases or bend points formed by the internal chambers which permit the pot holder to relatively easily fold or bend about the cooking implement. These rectangular or rhomboid chambers undesirably only provide these creases bi-directionally (i.e., in the two directions of the sides of the internal chambers) and do not account for the various angles a user may attempt to utilize the pot holder.

Additionally, conventional pot holders have numerous visible lines of stitching across their surfaces (in order to form the internal chambers). These lines can undesirably reduce the aesthetic appeal of the potholder. This is particularly true if the exterior of the fabric depicts a certain design or picture.

Furthermore, the addition of a border around the exterior edge of quilted pot holders adds an amount of stiffness that increases the amount of force a user must exert in order to grasp and hold a utensil. This additional stiffness undesirably reduces the tactile sensitivity or "feel" perceptible to a user. This reduction in feel could be potentially dangerous when grasping a heated cooking implement (e.g., a pot containing boiling water).

Lastly, stitching or sewing the creases which form the internal chambers of conventional pot holders reduces the thickness of the potholder in the immediate area around the crease. This reduced thickness undesirably decreases the amount of or compresses the insulation which is beneath the sewn area. This results in areas of reduced thermal insulation that increase the chance of a user being burned through the pot holder.

There is therefore a need for a new and improved pot holder which overcomes at least some of the previously delineated drawbacks of prior pot holders, which provides an effective and safe means to grasp heated cooking implements, and which can be used in a substantially omni-directional manner to grasp heated cooking implements.

SUMMARY OF THE INVENTION

It is a first advantage of the present invention to provide a pot holder which obviates the need to provide an exterior border by disposing the stitching along the outer-most edge of the pot holder.

It is a second advantage of the present invention to provide a pot holder which reduces the amount of visible stitching along the outer edges of the pot holder.

It is a third advantage of the present invention to provide a pot holder which permits an individual to employ the pot holder in substantially any direction while reducing the amount of stitching along the visible surfaces of the pot holder.

It is a fourth advantage of the present invention to provide a pot holder which reduces the possibility of a user being burned through the pot holder.

These and other features and advantages of the present invention will become apparent from a reading of the following detailed description of the preferred embodiment of the invention and by reference to the following drawings.

DETAILED DESCRIPTION OF THE PREFERRED EMBODIMENT OF THE INVENTION

Figure 1:
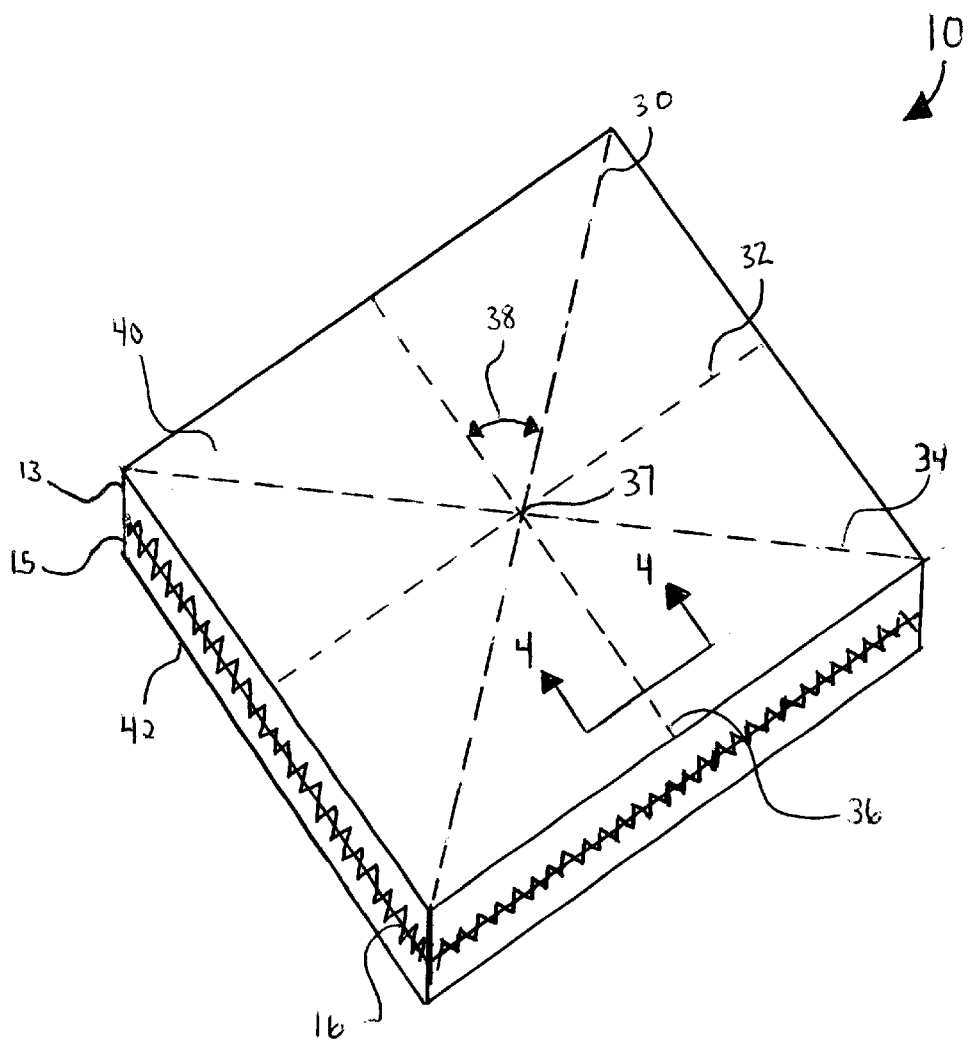
FIG. 1 is a perspective view of a pot holder which is made in accordance with the teachings of the preferred embodiment of the invention.
Figure 2:
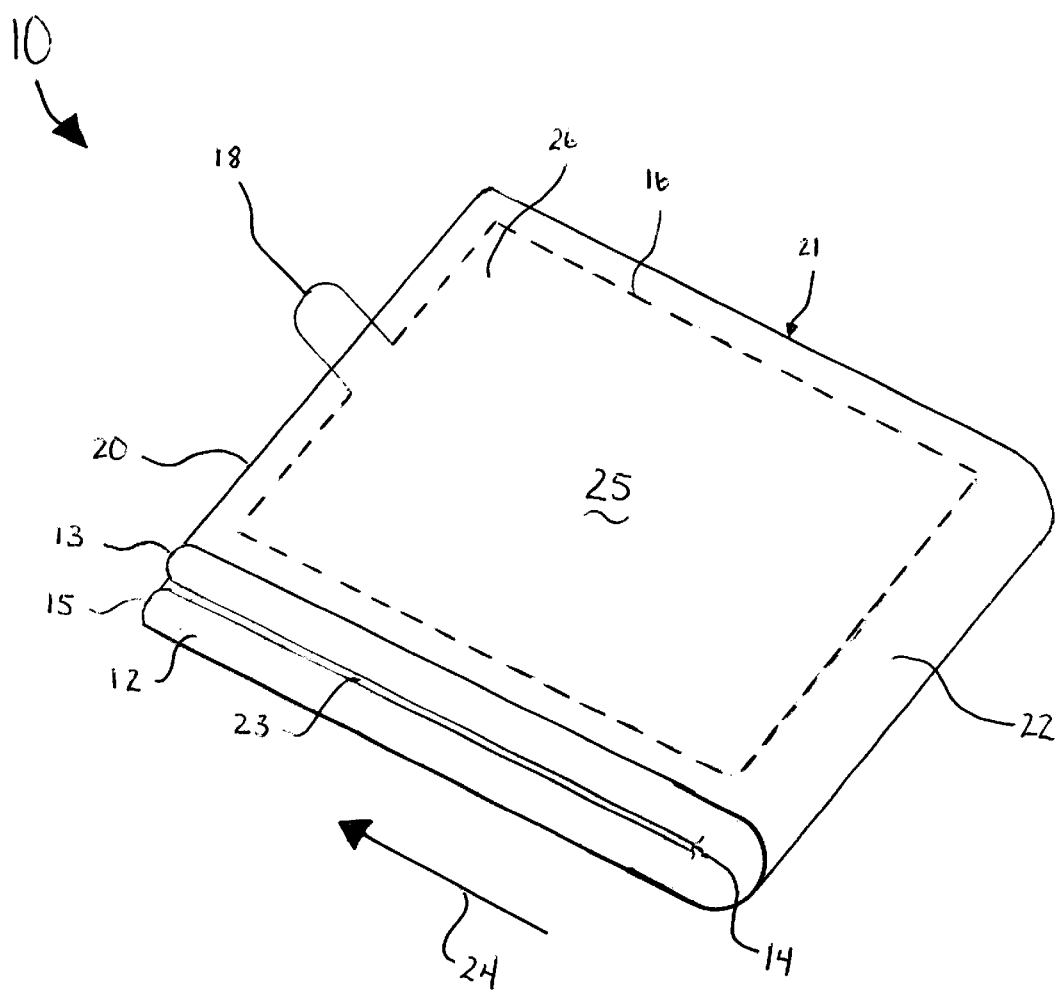
FIG. 2 is a perspective view of the pot holder shown in FIG. 1 and shows the pot holder in its initial stage of assembly.

Referring now to FIGS. 1 and 2, there is shown a pot holder 10 which is made in accordance with the teachings of the preferred embodiment of the invention. Particularly, the pot holder 10 includes a generally rectangular shaped piece of cloth, fabric, or other relatively soft and pliant material 12 (e.g., cotton terry cloth) which is folded over itself along its center 14 to form two layers 13, 15 each having a substantially square shape and having sides 20, 21, 22, and 23. Layers 13 and 15 are coupled together using conventional stitching 16 along sides 21, 22, and 23 in close proximity to the edges of sides 21–23 (e.g., approximately one-eighth of an inch (⅛") away from the edges of sides 21–23).

Stitching 16 is further used to couple layer 13 to layer 15 along side 20 in a manner substantially the same as sides 21–23, except a small gap or opening 18 is left "un-stitched" along side 20. Stitching 16 thereby creates a pocket 25 having an opening or access point at gap 18. It should be understood that gap 18 is shown in FIG. 2 disposed substantially in the middle of side 20, but this is for exemplary purposes only, as gap 18 may be disposed any place along side 20.

In the preferred embodiment of the invention, the pot holder 10 shown in FIG. 2 is inverted or "turned inside-out" whereby the interior surface of pocket 25 becomes the exterior surfaces 40, 42 of the pot holder 10 as shown in FIG. 1. Pot holder 10 is inverted by forcing side 22 through gap 18 in the direction of arrow 24. Importantly, as shown in FIG. 1, by inverting pot holder 10, the stitching 16 is disposed along the outer-most edge of pot holder 10. Inversion after stitching 16 has been applied to pot holder 10 obviates the necessity of using more complex sewing or coupling procedures to couple layers 13, 15 together while substantially eliminating any superfluous and unaesthetic stitching on the top and bottom surfaces 40, 42 of pot holder 10. After inversion, gap 18 may be stitched or sewn shut using a conventional cross-stitching technique, or any other procedure which precludes stitching being applied to top and bottom surfaces 40, 42.

Pot holder 10 further includes a plurality of bend points or creases that run across the top and bottom surfaces 40, 42. These bend points are formed by adding stitching lines 30–36 to pot holder 10 after inversion. As shown in FIG. 1, lines 30 36 are sewn in a manner where each of the lines 30–36 intersect each other at the approximate center point 37 of the pot holder 10. Furthermore, each line 30–36 is equally spaced radially about a center point 37 (i.e., each line 30–36 is disposed upon pot holder 10 at a certain angle 38 which divides surfaces 40, 42 into substantially equal portions). Each line. 30–36 either starts in a corner of the potholder 10 (lines 30, 34) or at the mid-point of a side of the pot holder 10 (lines 32, 36). Each line is sewn across the entire surface 40, 42 and terminates at the opposite corner or side of the pot holder 10. By intersecting at center 37 and traversing the entire surface 40, 42 of potholder 10, the lines 30–36 provides a user with a bend point to fold over the pot holder 10 in substantially any direction, regardless of how the pot holder 10 is oriented when it is picked up by the user.

As shown in FIG. 1, pot holder 10 includes four lines of stitching 30–36 and therefore angle 38 would be forty-five degrees and surfaces 40, 42 would be divided into eight substantially equally sized portions. It should be noted that this number of lines of stitching and angle of separation are for exemplary purposes only and other numbers of lines of stitching are intended.

Figure 3:
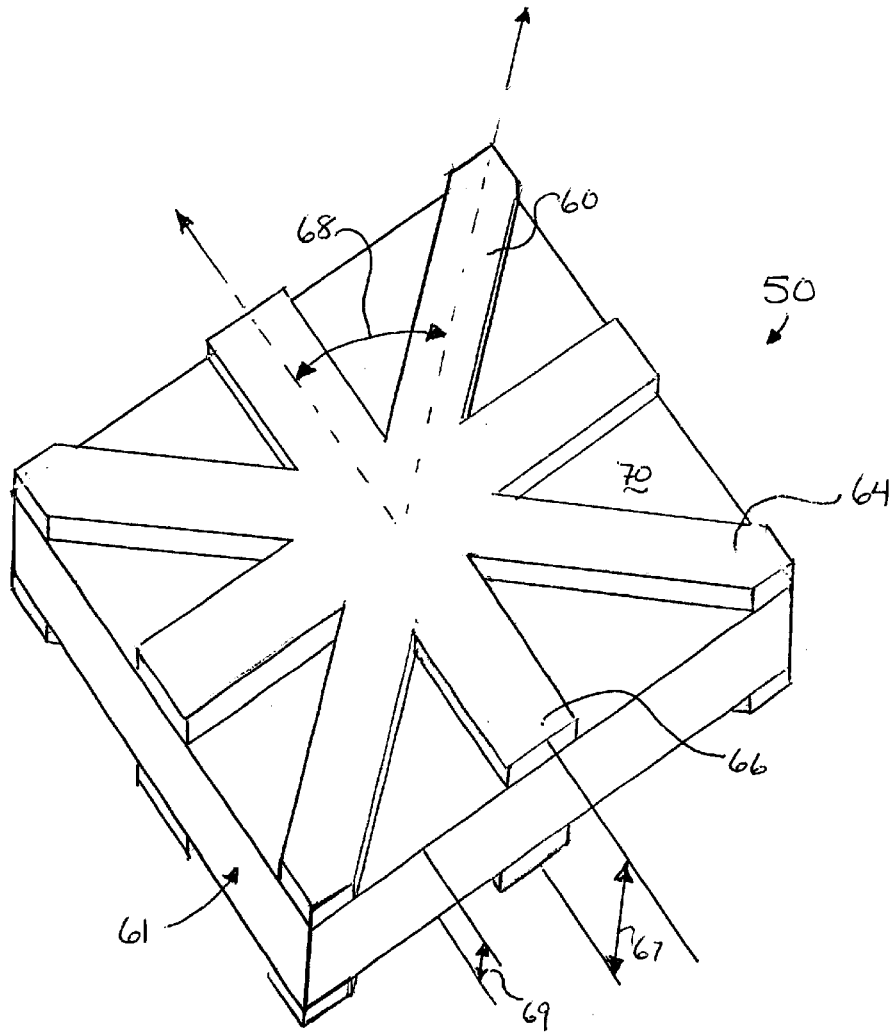
FIG. 3 is a perspective of a liner which may be inserted within the pot holder shown in FIGS. 1 and 2.
Figure 4:
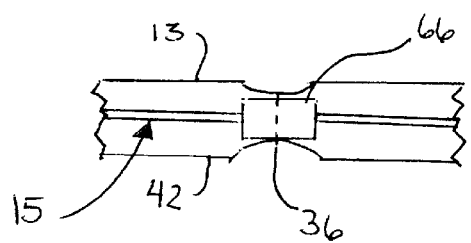
FIG. 4 is a cut-away side view of the liner shown in FIG. 3 disposed within the pot holder of FIGS. 1 and 2.

In an alternate embodiment of the invention, as shown in FIGS. 3 and 4, an additional layer or liner 50 may be provided to supplement the thermal-insulative properties of pot holder 10. Namely, liner 50 is approximately the same size as pot holder 10 and is shaped to fit between layers 13 and 15 of pot holder 10 (i.e., liner 50 is generally rectangular). Liner 50 is inserted between the outer layers of pot holder 10 by first temporarily coupling it to the "top" surface 26 (e.g., by using a few stitches to hold liner 50 to layer 13) and inverting layer 50 along with the rest of pot holder 10.

Liner 50 includes a layer 61 of thermally resistive material having a certain thickness 69. Liner 50 also includes a plurality of raised insulation surfaces 60–66 which are coupled to layer 61 and project from liner 50 to have a thickness 67 that is larger than the thickness 69 of layer 61. In the preferred embodiment of this invention, the raised surfaces 60–66 are integrally formed with layer 61, but in alternate embodiments surfaces 60–66 may be coupled to layer 61 in a conventional manner.

Importantly, raised surfaces 60 66 traverse across the entire surface of liner 50 in a manner exactly like that of stitching 30–36. Raised surfaces 60–66 are oriented relative to each other so that each has a certain angle of separation 68. This angle 68 is substantially equal to angle 38 of the lines of stitching 30–36. Furthermore, the number of raised surfaces which are upon liner 50 may vary, but are always equal to the number of lines of stitching that traverse the pot holder 10.

Liner 50 thereby includes a plurality of raised surfaces 60–66 which substantially align with the lines of stitching 30–36 previously described. As shown in FIG. 4, stitching 36 not only traverses across and through layers 13, 15 of pot holder 10, but also traverses across and through raised surface 66. Stitching 30–34 are similarly sewn across and through raised surfaces 60–66. In this manner, liner 50 provides a further layer of insulation in the areas of the pot holder 10 that have lines of stitching coupling the outer layers together.

Furthermore, the area between adjacent raised surfaces (e.g., the space between raised surfaces 62, 64) also provides additional thermal insulation as these raised surfaces 62, 64 form pockets or areas 70 of air between, for example the top layer 13 and the layer 61 of liner 50. This additional gap 70 separates the layers 13, 61, and 15 that requires any heat transfer to include not only conductive heat transfer but also radiant heat transfer thereby reducing the amount of heat which is transmitted from a heated surface on one side of pot holder 10 (e.g., surface 40) to the opposite side of pot holder 10 (e.g., surface 42) where a user's hand may be.

It should be appreciated that liner 50 can be made of substantially any heat resistant material which provides supplemental thermal protection while remaining relatively pliable.

It is to be understood that the invention is not limited to the exact construction or method which has been previously delineated, but that various changes and modifications may be made without departing from the spirit and the scope of the inventions as are set forth in the following claims.

What is claimed is:

1. A pot holder made by the process of:
    providing a rectangularly shaped cloth material;
    folding said cloth material in half to form two generally rectangular shaped layers which are coupled together along a folded side;
    sewing each of said layers together around the outer edge of said pair of layers, while leaving a relatively small gap that remains un-stitched along the side opposite of said folded side;
    inverting said pair of layers by forcing said folded side and the two side adjacent to said folded side through said gap; and
    sewing a plurality of lines of stitching across said pot holder, wherein said plurality of lines of stitching intersect at an approximate center point of said pot holder.

2. The pot holder of claim 1 wherein said plurality of lines of stitching are radially spaced apart equally forming a certain pattern.

3. The pot holder of claim 2 being further made by the process of:
    providing a thermally resistant liner having a plurality of raised surfaces which are arranged substantially identical to said certain pattern;
    coupling said liner to an exterior surface of one of said pair of layers prior to said step of inverting said pair of layers, whereby said liner is disposed between said pair of layers after said pot holder is inverted.

4. The pot holder of claim 3 wherein said step of sewing a plurality of lines of stitching across said potholder further comprises sewing a line of stitching through each of said plurality of raised surfaces.

5. A method for making a pot holder, said method comprising the steps of:
    providing a generally rectangular material;
    folding said generally rectangular material in half to form two substantially equal halves each having first and second adjacent corners, a third corner which is opposite of said first corner, and a fourth corner which is opposite of said second corner;

coupling each half of said folded material together by passing an amount of stitching through both halves of material around the outer edged of said folded material a certain distance away from the outer edge of said folded material;

inverting said coupled halves of material whereby said amount of stitching is disposed along the outer periphery of said pot holder; and forming a plurality of intersecting creases through said pot holder.

6. The method of claim 4 wherein said step of forming a plurality of intersecting creases through said pot holder comprises the step of sewing a plurality of lines of stitching across the outer surface of said pot holder in a certain pattern, wherein said plurality of lines of stitching substantially intersect at the approximate middle of said pot holder and are radially and equally spaced about said approximate middle.

7. The method of claim 5 said step of forming a plurality of intersecting creases through said pot holder further comprises the steps of:

sewing a first line of stitching across said pot holder from said first corner to said third corner;

sewing a second line of stitching across said pot holder from said second corner to said fourth corner;

sewing a third line of stitching from the middle of a first edge across said pot holder to the middle of the edge opposite of said first edge; and sewing a fourth line of stitching from the middle of a second edge which is adjacent to said first edge across said pot holder to the middle of the edge opposite of said second edge.

8. The method of claim 5 further comprising the steps of:

providing a liner member having a plurality of raised surfaces that are arranged substantially the same as said certain pattern; and coupling said liner member to an outer surface of said pot holder prior to said step of inverting said coupled halves of material;

wherein said liner member is inverted along with said coupled halves of material.

* * * * *